Feb. 7, 1928.
H. J. SCHAFFER
ASH SIFTER
Filed July 8, 1926
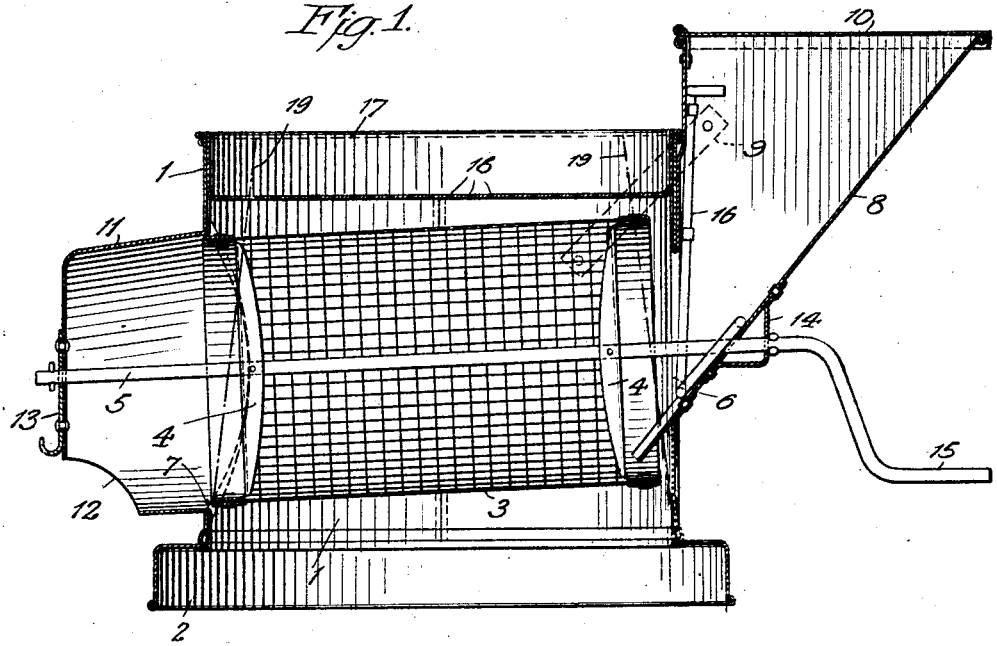
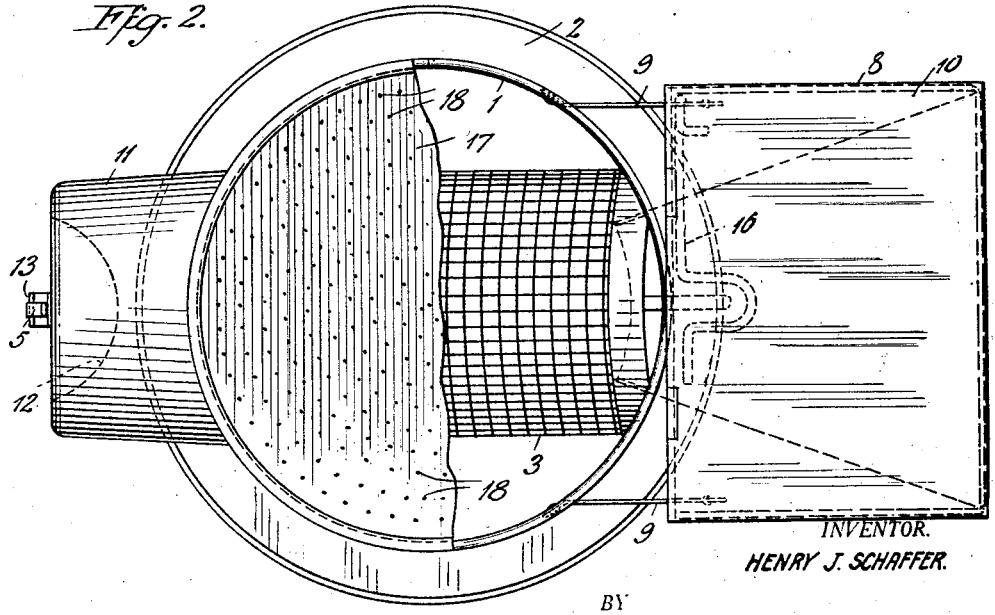
INVENTOR.
HENRY J. SCHAFFER.
BY
ATTORNEYS Patented Feb. 7, 1928.

1,658,060

UNITED STATES PATENT OFFICE.

HENRY J. SCHAFFER, OF BROOKLYN, NEW YORK.

ASH SIFTER.

Application filed July 8, 1926. Serial No. 121,089.

The ash sifter in which this invention is embodied may be considered as a further development of or improvement upon the ash sifter which forms the subject of my Patent #1,378,623, dated May 17, 1921. In that sifter as well as in others as now commonly made there is a horizontally extended casing body which is rectangular at its base. Also a feature of this patented sifter is the introduction of a dust allaying liquid through a hollow perforated shaft which supports and is employed to rotate a cylindrical screen into which the liquid is sprayed from the perforations in the hollow shaft.

Among the objects of the invention are to reduce the cost of manufacture and at the same time to provide an improved sifter of simple construction which will be effective in operation, convenient to operate and durable. Other objects and advantages of my invention will hereinafter appear.

In carrying out my invention, as shown in the illustrated embodiment thereof and in accordance therewith, I provide an upright cylindrical casing or body within which the rotatable drum-shaped sifting screen extends transversely and which is open at its lower end and there provided with an annular base flange to rest upon and have telescopic relation with the open top of a usual cylindrical ash can. Also in the form of the invention shown in the drawings a removable liquid containing sprinkling pan is provided to telescope into the upper open end of the cylindrical casing body to be supported thereby and having a perforated bottom. A further feature of the invention is a one-piece discharge spout partly closed at its outer end and flanged at its open inner end through an opening in the side wall of the casing body and which may be rapidly and inexpensively stamped or drawn from suitable sheet metal at a single operation and at another simple operation a discharge opening may be cut by stamping partly from the lower wall and partly from the lower portion of the outer end wall of this spout. Another feature is the provision in the feed hopper of an agitator for loosening the material to prevent clogging of the hopper outlet into the casing body and cylindrical screen. My invention also includes various other features of construction and combinations of parts as will appear from the following description.

The ash sifter shown in the accompanying drawings as an embodiment of the invention will now be particularly described and thereafter the invention will be pointed out in claims, reference now being had to the drawings in which:

Fig. 1 is a central vertical section taken longitudinally of the rotatable cylindrical screen and its operating shaft; and Fig. 2 is a plan view partly broken away at the top.

In the ash sifter constituting the embodiment of the invention shown in the drawings an upright cylindrical casing body 1 open at the bottom and also shown as open at the top, for reasons which will hereinafter appear, may be formed from a single rectangular sheet of metal, as shown in the drawings, or it may be in several similar smaller pieces, as desired. At its lower open end the cylindrical casing body 1 has connected thereto an annular outwardly and downwardly extending base flange 2 shown as of an inverted L shape. The horizontal portion of this annular flange provides a shelf or annular shoulder to rest upon the open top of a usual cylindrical ash can while the lower vertical cylindrical portion of this flange may snugly removably telescope over the top of such ash can in the same manner as does the usual cover therefor. This base flange 2 is firmly and rigidly connected to the lower end of the casing body 1 by means of an exterior annular groove in the casing body in which the inner edge of the flange is firmly gripped, as shown in Fig. 1, this groove being formed by means of a bead and a small end flange on the casing body. With this construction of the connection, the base flange 2 may be quickly and conveniently seamed in place by means of a suitable machine. It is to be noted that an entirely unobstructed circular opening of the full size of the cylindrical body part 1 is provided for the fine sifted ashes or screenings to drop into the ash can upon which the sifter is supported.

A drum-shaped or cylindrical axially elongated sifter screen 3 is rotatably mounted in and extends transversely at a slight inclination in a vertical diametrical plane within and across the cylindrical casing body 1 and is open at its opposite ends. At its open ends the cylindrical screen 3 is provided with substantially usual stiffening rings, as shown, to which are secured the turned over ends of cross arms 4 which at their middle are of substantially U shaped cross section and which may be readily stamped or drawn from plain sheet metal strips at one operation. A rotatable operating shaft 5 extends transversely through the cylindrical casing body 1 and axially through the cylindrical sifter screen 3 passing through the webs of the arms 4, the flanges of which are removably pinned, as shown in Fig. 1, to the shaft 5. This feature of construction, including the cross arms 4 for mounting the screen 3 upon its shaft 5, is claimed in my above noted patent.

At the higher or intake end of the cylindrical sifter screen 3 the cylindrical wall of the casing body 1 is provided with a suitable inlet opening 6 for the material to be sifted and at its other side the wall of the casing body 1 is provided with a large outlet or delivery opening 7 in alignment with the adjacent open end of the cylindrical screen 3. A downwardly tapering feed hopper 8 is secured to the side wall of the casing body 1 and opens at its lower end through the inlet opening 6 into the end of the screen 3, the inclined combined outer and lower wall of this hopper, which also forms a chute, being extended into the open end of the screen, as is shown in the drawings. This hopper 8 is shown at its top as being of rectangular horizontal cross section but may, if desired, be of a different shape, for example, curved or bowed outwardly. The hopper 8 is braced to the side of the casing body 1 by means of straps 9 and is shown as provided with a usual hinged cover 10.

Delivery means are provided for directing outwardly the larger sized or screened material passing from the screen 3 out through the outlet opening 7, such means being shown in the drawings as comprising a one-piece slightly outwardly tapering spout 11 which may be of substantially circular vertical cross section and may be provided as shown (Fig. 1) with an outer end wall the lower portion of this end wall together with an adjacent portion of the lower wall, at the lower and outer corner of this spout, being cut away to provide a discharge opening 12. At its inner open end the spout 11 is provided with an external attaching flange secured to the casing wall of the body, most desirably at the inside thereof, as shown in Fig. 1. The spout 11 may be readily drawn to shape by a single stamping operation and by a subsequent punching operation the discharge opening 12 therein may be cut out. In order to enable this spout 11 to be readily drawn or stamped out, somewhat heavier material is used than that for the casing body 1 and other parts of the sifter, as is shown in Fig. 1. A hooked strap 13 on the outer end wall of the spout 11 provides for hanging a pail thereon to receive the screened material and also provides a bearing for this end of the screen shaft 5, which is removably retained therein by means of a transverse pin or key as shown. The other or forward portion of this shaft 5 may be upset, as shown in Fig. 1, and is there shown as journaled in a bearing strap 14 on the inclined wall of the hopper 8, the outer end portion of the shaft 5 being bent to form a crank handle 15.

It is to be understood that if desired the delivery end of the cylindrical screen 3 may be extended out through the outlet opening 7 so as to form discharging means for the coarse screened material, and in such case the bearing for the rear end of the screen shaft 5, together with the hook for a pail, may be provided by means of bent straps secured at their inner or forward ends to the wall of the casing body 1, the discharge spout 11 then being omitted.

An agitator is shown as provided in the hopper 8 for loosening the material therein adjacent to the feed opening or hopper outlet 6, to relieve or prevent the clogging of this opening with the material in the hopper. This agitator is shown as a bar 16 mounted to slide up and down in clips on the hopper 8 at one of its inner corners, the upper end of this agitator bar being bent to provide a handle, as shown, and the lower end thereof being bent in substantially L shape across the feed opening 6 and to lie substantially flat against the inclined floor of the hopper adjacent to the opening 6 in the casing body 1. This agitating bar is shown as formed of a bent rod, and as having in its laterally extending foot a U bend around the sifter shaft 5 and lies flat against the inclined wall of the hopper. This U-bent portion also assists in the agitation and by reason of its inclination will have a tendency to push the material through the opening 6 into the screen 3, when the rod 16 is lifted. The hopper 8 may be formed from a single piece of sheet metal, or it may be formed by means of a plurality of joined pieces, as desired.

A circular liquid-containing sprinkling pan 17 may be stamped or drawn at a single operation from a piece of sheet metal, to snugly but removably telescope into the upper circular open end of the casing body 1, and is shown as provided at its top with an outer flange to rest upon the top of the casing body, for thereby supporting this pan therein, and also providing convenient means for lifting the pan 17 out. The bottom of this pan 17 is provided throughout as shown, or it may be thus provided to the extent desired, with a large number of small perforations 18 for supplying sprinkling liquid, e. g., water, from the pan. This liquid will be sprinkled or rained upon and around the cylindrical sifting screen 3, for allaying, i. e., preventing or settling, dust caused by the sifting operation. The perforated sprinkling pan 17 may be secured permanently in the upper end of the casing body 1 if so desired and in such case if desired it could be formed in the casing body by means of a perforated floor or septum supported in and extending across the casing body. Should it be desired for commercial reasons to omit this sprinkling feature from the sifter then the upper end of the casing body 1 may be permanently closed if desired. When the perforated removable sprinkling pan 17 is employed as shown, free access may be had to the interior of the casing body 1 and screen 3 through the top as well as bottom of the casing body.

The sprinkling pan 17 may be produced or formed by drawing or stamping at a single operation. Also the annular base flange 2 may be similarly produced at a single drawing or stamping operation. The flat circular piece of sheet metal which is cut from the center in forming the base flange 2 may be used for other purposes, such as to form a cover or a bottom for a smaller size pan or pail. By making the casing body, which is shown as a cylindrical body 1, somewhat tapering in an upward direction, as is clearly indicated by the broken lines 19 in Fig. 1, the piece of metal which is cut out in forming the base flange 2 may be utilized to form a sprinkling pan similar to the pan 17 but of somewhat smaller size to fit into the upper reduced end of the upwardly tapering casing body. In such case, the construction of the sifter in other respects may be substantially the same as is shown in the drawings.

It has been found that the cost of manufacture of a sifter such as shown in the drawings and hereinbefore described has been considerably reduced as compared with that of other sifters as heretofore commonly constructed and marketed. This has proved particularly true as to the annular or simple cylindrical upright casing body 1, as well as to the simple annular or circular base flange 2 together with the facility of securing the latter to the casing body in manufacturing. The final result, as shown in the drawings, is an exceedingly simple and highly effective construction by which the objects of the invention are carried out.

While the ash sifter shown in the drawings as an embodiment of the invention has been constructed in the best way at present known for satisfactorily meeting manufacturing and commercial requirements, it is to be understood that various modifications some of which have been mentioned, may be made in the construction shown in the drawings and above particularly described, without departing from the principle and scope of the invention as defined in the appended claims.

I claim:

1. In a sifter, the combination of an upright casing body of circular cross section open at the bottom and there provided with an annular supporting flange, a rotatable operating shaft extending transversely through the casing body, an open-ended tubular screen surrounding the shaft and fixed thereto to be rotated thereby, a chute supported by the body for feeding material into one end of the screen, and a peripherally circular pan supported by and of a diameter to close the top of the body and having a perforated bottom for sprinkling liquid upon and around the screen and upon the material being sifted.

2. In a sifter, the combination of an upright annular casing body open at the top and bottom, an annular base flange connected to and extending outwardly and downwardly from the lower end of the annular body, an inclined cylindrical screen extending transversely within the annular body, means for supporting and rotating the screen, means for feeding material into the higher end of the screen, and a liquid-containing pan having a perforated bottom and an annular side wall extending up from the bottom to telescope into the upper end of the annular body and be supported thereby.

3. In a sifter, the combination of an upright casing body, a sifting screen mounted for sifting movement therein, and a separably removable sprinkling pan with a peripheral side wall to telescope into the upper end of the body and having an outer flange at the top of the side wall to support the pan on the upper end of the body and a perforated bottom for sprinkling liquid on the screen and the material sifted thereby.

4. In a sifter, the combination of an upright casing body, a sifting screen mounted for sifting movement therein, means for feeding material to the screen through a side wall of the body, and means for sprinkling liquid on the screen and material sifted thereby including a perforated septum within and transversely filling the casing body to form a closure therefor above the screen and below the top of the casing body.

5. In a sifter, the combination of an upright casing wall provided with a delivery opening and a one-piece pressed metal discharge spout having an attaching flange at the inner side of the casing body wall and projecting outwardly through said delivery opening, such spout including an outer end wall and being provided with a discharge opening in its lower outer corner partly in the bottom wall and partly in the outer end wall thereof.

6. In a sifter, the combination of an upright cylindrical casing body open at the top, a sifting screen mounted for sifting movement therein, and a peripherally circular separably removable sprinkling pan to telescope into the upper end of the cylindrical body to be supported thereby and having a perforated bottom to sprinkle liquid from the pan upon the screen and material sifted thereby and an annular side wall extending up from its bottom for telescoping into said body.

7. In a sifter, the combination of a feed hopper including an upright wall having a feed opening therein and a downwardly inclined floor wall projecting through said opening at the lower edge thereof, and an agitating bar extending transversely of said opening adjacent to said floor wall.

In witness whereof, I hereunto subscribe my signature.

HENRY J. SCHAFFER.